United States Patent
Haratsch et al.

(10) Patent No.: US 8,879,182 B2
(45) Date of Patent: *Nov. 4, 2014

(54) STORAGE MEDIA INTER-TRACK INTERFERENCE CANCELLATION

(75) Inventors: Erich Franz Haratsch, Bethlehem, PA (US); George Mathew, San Jose, CA (US); Ming Jin, Fremont, CA (US); Jongseung Park, Allentown, PA (US); Timothy W. Swatosh, Rochester, MN (US); Timothy B. Lund, Rochester, MN (US); Carl E. Forhan, Rochester, MN (US)

(73) Assignee: LSI Corporation, San Jose, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/591,937

(22) Filed: Aug. 22, 2012

(65) Prior Publication Data

US 2013/0021689 A1 Jan. 24, 2013

Related U.S. Application Data

(63) Continuation-in-part of application No. 13/186,174, filed on Jul. 19, 2011, and a continuation-in-part of (Continued)

(51) Int. Cl.
*G11B 5/09* (2006.01)
*G11B 20/10* (2006.01)
(Continued)

(52) U.S. Cl.
CPC .. *G11B 20/10046* (2013.01); *G11B 2020/1298* (2013.01); *G11B 20/1217* (2013.01); *G11B*

(Continued)

(58) Field of Classification Search
CPC .... G11B 20/10212; G11B 20/22; G11B 5/54; G11B 5/5521; G11B 5/74; G11B 5/82; G11B 5/00; G11B 19/04; G11B 19/041; G11B 19/0451

USPC ................ 360/18, 31, 39, 41, 45, 55, 65, 48, 360/77.08

See application file for complete search history.

(56) References Cited

U.S. PATENT DOCUMENTS 5,278,703 A 1/1994 Rub
5,278,846 A 1/1994 Okayama et al.
(Continued)

FOREIGN PATENT DOCUMENTS

EP 0522578 1/1993
EP 0631277 12/1994
(Continued)

OTHER PUBLICATIONS

Vasic, B., et al., "Soft-Error-Event Decoding for Multitrack Magnetic Recording Channels", IEEE Transactions on Magnetics. vol. 40, Issue 2, pp. 492-497, Mar. 2004 (USA).

(Continued)

*Primary Examiner* — Thomas Alunkal
(74) *Attorney, Agent, or Firm* — Hamilton DeSanctis & Cha

(57) ABSTRACT

Described embodiments provide a method of cancelling inter-track interference (ITI) from one or more sectors read from a desired track of a storage medium. A road channel reads sectors in a desired track of the storage medium. A decoder of the read channel decodes the read sectors, and if the read sectors are incorrectly recovered from the storage medium, selected sectors of a first adjacent track and a second adjacent track are read. An ITI canceller of the read channel estimates ITI in the read sectors of the desired track corresponding to the selected sectors of each adjacent track and subtracts the estimated ITI of each adjacent track from the data for the sectors of the desired track, providing updated sector data. The ITI cancelled data is replayed to the decoder, which decodes the ITI cancelled data and provides the decoded ITI cancelled data as output of the read channel.

12 Claims, 7 Drawing Sheets

Related U.S. Application Data application No. 13/186,197, filed on Jul. 19, 2011, and a continuation-in-part of application No. 13/186,213, filed on Jul. 19, 2011, and a continuation-in-part of application No. 13/250,246, filed on Sep. 30, 2011, and a continuation-in-part of application No. 13/460,204, filed on Apr. 30, 2012.

(51) Int. Cl.
*G11B 19/04* (2006.01)
*G11B 5/012* (2006.01)
*G11B 20/14* (2006.01)
*G11B 20/12* (2006.01)
*G11B 20/18* (2006.01)

(52) U.S. Cl.
CPC  19/045 (2013.01); *G11B 2020/183* (2013.01); *G11B 2020/10759* (2013.01); *G11B 2020/185* (2013.01); *G11B 2220/2516* (2013.01); *G11B 2020/1232* (2013.01); *G11B 20/10462* (2013.01); *G11B 2020/1856* (2013.01); *G11B 5/012* (2013.01); *G11B 20/1423* (2013.01)
USPC ............................. 360/45; 360/48

(56) References Cited

U.S. PATENT DOCUMENTS

| | | | |
|---|---|---|---|
| 5,325,402 A | 6/1994 | Ushirokawa | |
| 5,371,638 A | 12/1994 | Saliba | |
| 5,392,299 A | 2/1995 | Rhines et al. | |
| 5,471,500 A | 11/1995 | Blaker et al. | |
| 5,513,192 A | 4/1996 | Janku et al. | |
| 5,523,903 A | 6/1996 | Hetzler | |
| 5,550,870 A | 8/1996 | Blaker et al. | |
| 5,612,964 A | 3/1997 | Haraszti | |
| 5,701,314 A | 12/1997 | Armstrong et al. | |
| 5,710,784 A | 1/1998 | Kindred et al. | |
| 5,712,861 A | 1/1998 | Inoue et al. | |
| 5,717,706 A | 2/1998 | Ikeda | |
| 5,748,592 A | 5/1998 | Hino et al. | |
| 5,768,044 A | 6/1998 | Hetzler | |
| 5,802,118 A | 9/1998 | Bliss et al. | |
| 5,844,945 A | 12/1998 | Nam et al. | |
| 5,898,710 A | 4/1999 | Amrany | |
| 5,917,855 A | 6/1999 | Kim | |
| 5,923,713 A | 7/1999 | Hatakeyama | |
| 5,940,238 A | 8/1999 | Nayak et al. | |
| 5,966,259 A | 10/1999 | Mitsuishi et al. | |
| 5,978,414 A | 11/1999 | Nara | |
| 5,983,383 A | 11/1999 | Wolf | |
| 6,005,897 A | 12/1999 | McCallister et al. | |
| 6,023,783 A | 2/2000 | Divsalar et al. | |
| 6,029,264 A | 2/2000 | Kobayashi et al. | |
| 6,041,432 A | 3/2000 | Ikeda | |
| 6,065,149 A | 5/2000 | Yamanaka | |
| 6,091,701 A * | 7/2000 | Koboyashi ................. 369/275.4 |
| 6,097,764 A | 8/2000 | McCallister et al. | |
| 6,145,110 A | 11/2000 | Khayrallah | |
| 6,216,249 B1 | 4/2001 | Bliss et al. | |
| 6,216,251 B1 | 4/2001 | McGinn | |
| 6,229,467 B1 | 5/2001 | Eklund et al. | |
| 5,317,472 A1 | 6/2001 | Choi et al. | |
| 6,266,795 B1 | 7/2001 | Wei | |
| 6,317,472 B1 | 11/2001 | Choi et al. | |
| 6,351,832 B1 | 2/2002 | Wei | |
| 6,377,610 B1 | 4/2002 | Hagenauer et al. | |
| 6,381,726 B1 | 4/2002 | Weng | |
| 6,438,717 B1 | 8/2002 | Butler et al. | |
| 6,473,878 B1 | 10/2002 | Wei | |
| 6,476,989 B1 | 11/2002 | Chainer et al. | |
| 6,625,775 B1 | 9/2003 | Kim | |
| 6,657,803 B1 | 12/2003 | Ling et al. | |
| 6,671,404 B1 | 12/2003 | Kawatani et al. | |
| 6,735,028 B1 | 5/2004 | Rothschild | |
| 6,748,034 B2 | 6/2004 | Hattori et al. | |
| 6,757,862 B1 | 6/2004 | Marianetti, II | |
| 6,785,863 B2 | 8/2004 | Blankenship et al. | |
| 6,788,654 B1 | 9/2004 | Hashimoto et al. | |
| 6,810,502 B2 | 10/2004 | Eidson | |
| 6,826,140 B2 | 11/2004 | Brommer et al. | |
| 6,980,382 B2 | 12/2005 | Hirano et al. | |
| 6,986,098 B2 | 1/2006 | Poeppelman | |
| 7,002,762 B2 | 2/2006 | Mayergoyz et al. | |
| 7,010,051 B2 | 3/2006 | Murayama et al. | |
| 7,047,474 B2 | 5/2006 | Rhee et al. | |
| 7,058,873 B2 | 6/2006 | Song et al. | |
| 7,068,459 B1 | 6/2006 | Cloke | |
| 7,073,118 B2 | 7/2006 | Greenberg et al. | |
| 7,093,179 B2 | 8/2006 | Shea | |
| 7,113,356 B1 | 9/2006 | Wu | |
| 7,136,244 B1 | 11/2006 | Rothbert | |
| 7,173,783 B1 | 2/2007 | McEwen et al. | |
| 7,184,486 B1 | 2/2007 | Wu et al. | |
| 7,191,378 B2 | 3/2007 | Eroz et al. | |
| 7,203,015 B2 | 4/2007 | Sakai et al. | |
| 7,203,887 B2 | 4/2007 | Eroz et al. | |
| 7,236,757 B2 | 6/2007 | Raghavan et al. | |
| 7,253,986 B2 | 8/2007 | Berman et al. | |
| 7,257,764 B2 | 8/2007 | Suzuki et al. | |
| 7,310,768 B2 | 12/2007 | Eidson et al. | |
| 7,313,750 B1 | 12/2007 | Feng et al. | |
| 7,370,258 B2 | 5/2008 | Iancu et al. | |
| 7,403,752 B2 | 7/2008 | Raghavan et al. | |
| 7,428,120 B2 | 9/2008 | Berman et al. | |
| 7,430,256 B2 | 9/2008 | Zhidkov | |
| 7,502,189 B2 | 3/2009 | Sawaguchi et al. | |
| 7,505,537 B1 | 3/2009 | Sutardja | |
| 7,523,375 B2 | 4/2009 | Spencer | |
| 7,509,927 B2 | 9/2009 | Shin et al. | |
| 7,587,657 B2 | 9/2009 | Haratsch | |
| 7,590,168 B2 | 9/2009 | Raghavan et al. | |
| 7,702,989 B2 | 4/2010 | Graef et al. | |
| 7,712,008 B2 | 5/2010 | Song et al. | |
| 7,738,201 B2 | 6/2010 | Jin et al. | |
| 7,752,523 B1 | 7/2010 | Chaichanavong | |
| 7,801,200 B2 | 9/2010 | Tan | |
| 7,801,253 B1 | 9/2010 | Wu | |
| 7,802,163 B2 | 9/2010 | Tan | |
| 8,169,730 B2 | 5/2012 | Cheng et al. | |
| 8,259,872 B2 | 9/2012 | Wu et al. | |
| 8,300,339 B1 * | 10/2012 | Nangare et al. ................. 360/39 |
| 2003/0063405 A1 | 4/2003 | Jin et al. | |
| 2003/0081693 A1 | 5/2003 | Raghaven et al. | |
| 2003/0087634 A1 | 5/2003 | Raghaven et al. | |
| 2003/0112896 A1 | 6/2003 | Raghaven et al. | |
| 2003/0117914 A1 * | 6/2003 | Kanaoka et al. ........... 369/47.17 |
| 2003/0134603 A1 | 7/2003 | Raghaven et al. | |
| 2004/0071206 A1 | 4/2004 | Takatsu | |
| 2004/0098659 A1 | 5/2004 | Bjerke et al. | |
| 2005/0010855 A1 | 1/2005 | Lusky | |
| 2005/0078399 A1 | 4/2005 | Fung | |
| 2005/0111540 A1 | 5/2005 | Modrie et al. | |
| 2005/0157780 A1 | 7/2005 | Werner et al. | |
| 2005/0180039 A1 | 8/2005 | Mayergoyz et al. | |
| 2005/0195749 A1 | 9/2005 | Elmasry et al. | |
| 2005/0216819 A1 | 9/2005 | Chugg et al. | |
| 2005/0273688 A1 | 12/2005 | Argon | |
| 2006/0020872 A1 | 1/2006 | Richardson et al. | |
| 2006/0031737 A1 | 2/2006 | Chugg et al. | |
| 2006/0123285 A1 | 6/2006 | De Araujo et al. | |
| 2006/0140311 A1 | 6/2006 | Ashley et al. | |
| 2006/0168493 A1 | 7/2006 | Song et al. | |
| 2006/0181975 A1 | 8/2006 | Padiy | |
| 2006/0195772 A1 | 8/2006 | Graef et al. | |
| 2006/0210002 A1 | 9/2006 | Yang et al. | |
| 2006/0248435 A1 | 11/2006 | Haratsch | |
| 2006/0256670 A1 | 11/2006 | Park et al. | |
| 2007/0047121 A1 | 3/2007 | Elefeheriou et al. | |
| 2007/0047635 A1 | 3/2007 | Stojanovic et al. | |
| 2007/0110200 A1 | 5/2007 | Mergen et al. | |
| 2007/0230407 A1 | 10/2007 | Petrie et al. | |
| 2007/0011569 A1 | 12/2007 | Vila Casado et al. | |
| 2007/0286270 A1 | 12/2007 | Huang et al. | |

(56) References Cited

U.S. PATENT DOCUMENTS

| | | | |
|---|---|---|---|
| 2008/0049825 A1 | 2/2008 | Chen et al. | |
| 2008/0055122 A1 | 3/2008 | Tan | |
| 2008/0065970 A1 | 3/2008 | Tan | |
| 2008/0069373 A1 | 3/2008 | Jiang et al. | |
| 2008/0151704 A1* | 6/2008 | Harada | 369/30.22 |
| 2008/0168330 A1 | 7/2008 | Graef et al. | |
| 2008/0276156 A1 | 11/2008 | Gunnam | |
| 2008/0301521 A1 | 12/2008 | Gunnam | |
| 2009/0135693 A1 | 5/2009 | Kim et al. | |
| 2009/0185643 A1 | 7/2009 | Fitzpatrick | |
| 2009/0190251 A1* | 7/2009 | Yokohata et al. | 360/78.01 |
| 2009/0199071 A1 | 8/2009 | Graef | |
| 2009/0235116 A1 | 9/2009 | Tan et al. | |
| 2009/0235146 A1 | 9/2009 | Tan et al. | |
| 2009/0259915 A1 | 10/2009 | Livshitz et al. | |
| 2009/0273492 A1 | 11/2009 | Yang et al. | |
| 2009/0274247 A1 | 11/2009 | Galbraith et al. | |
| 2010/0002795 A1 | 1/2010 | Raghaven et al. | |
| 2010/0042877 A1 | 2/2010 | Tan | |
| 2010/0042890 A1 | 2/2010 | Gunnam | |
| 2010/0050043 A1 | 2/2010 | Savin | |
| 2010/0061492 A1 | 3/2010 | Noeldner | |
| 2010/0070837 A1 | 3/2010 | Xu et al. | |
| 2010/0164764 A1 | 7/2010 | Nayak | |
| 2010/0185914 A1 | 7/2010 | Tan et al. | |
| 2011/0075292 A1 | 3/2011 | New et al. | |
| 2011/0075569 A1 | 3/2011 | Marrow et al. | |
| 2011/0080211 A1 | 4/2011 | Yang et al. | |
| 2011/0119498 A1 | 5/2011 | Guyot | |
| 2011/0167246 A1 | 7/2011 | Yang et al. | |
| 2011/0181978 A1* | 7/2011 | Rub | 360/55 |
| 2011/0311002 A1 | 12/2011 | Li et al. | |
| 2012/0105994 A1* | 5/2012 | Bellorado et al. | 360/45 |
| 2012/0134044 A1* | 5/2012 | Yoshida et al. | 360/51 |
| 2013/0031406 A1 | 1/2013 | Cho | |
| 2013/0170061 A1 | 7/2013 | Saito et al. | |
| 2013/0265669 A1 | 10/2013 | Hostetter | |

FOREIGN PATENT DOCUMENTS

| | | |
|---|---|---|
| EP | 1814108 | 8/2007 |
| WO | 2006/016751 | 2/2006 |
| WO | 2006/134527 | 12/2006 |
| WO | 2007/091797 | 8/2007 |
| WO | 2010126482 | 4/2010 |
| WO | 2010/101578 | 9/2010 |

OTHER PUBLICATIONS

Vea, M., et al., "Detection in Magnetic Recording with Cross-Track Interference", 1991 Conference Record of the 25th Asilomar Conference on Signals, Systems and Computers, Nov. 1991 (USA).
Singla, N., et al., "Decoding for Magnetic Recording Media with Overlapping Tracks", Digests of the IEEE International Magnetics Conference 2005, Apr. 2005 (Japan).
Karakulak, S., et al., "A Parametric Study of Inter-Track Interference in Bit Patterned Media Recording", IEEE Transactions on Magnetics, vol. 46, Issue 3, pp. 819-024, Feb. 2010 (USA).
Mita, S., et al., "Reduction of Bit Errors due to Inter-Track Interference using LLRS of Neighboring Tracks", IEEE Transactions on Magnetics, vol. 47, Issue 10, pp. 3316-3319, Sep. 2011 (USA).
Haratsch, E., "Advanced Read Channel Technologies", Accelerating Innovation Summit, Nov. 2011 (USA).
Hall, D., et al., "Data Handling Algorithms for Autonomous Shingled Magnetic Recording HDDs", IEEE Transactions on Magnetics, vol. 48, No. 5, May 2012 (USA).
U.S. Appl. No. 13/186,213, filed Jul. 19, 2011, Mathew, George et al.
U.S. Appl. No. 13/186,197, filed Jul. 19, 2011, Mathew, George et al.
U.S. Appl. No. 13/186,146, filed Jul. 19, 2011, Mathew, George et al.
U.S. Appl. No. 11/461,026, filed Jul. 31, 2006, Tan, Weijun.
U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu et al.
U.S. Appl. No. 12/652,201, filed Jan. 5, 2010, Mathew et al.
U.S. Appl. No. 12/763,050, filed Apr. 19, 2010, Ivkovic et al.
U.S. Appl. No. 12/792,555, filed Jun. 2, 2010, Liu et al.
U.S. Appl. No. 12/887,317, filed Sep. 21, 2010, Xia et al.
U.S. Appl. No. 12/887,330, filed Sep. 21, 2010, Zhang et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/901,742, filed Oct. 11, 2010, Yang.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/947,947, filed Nov. 17, 2010, Ivkovic et al.
U.S. Appl. No. 12/972,942, filed Dec. 20, 2010, Liao et al.
U.S. Appl. No. 12/992,948, filed Nov. 16, 2010, Yang et al.
U.S. Appl. No. 13/021,814, filed Feb. 7, 2011, Jin, Ming et al.
U.S. Appl. No. 13/031,818, filed Feb. 22, 2011, Xu, Changyou et al.
U.S. Appl. No. 13/050,129, filed Mar. 17, 2011, Tan et al.
U.S. Appl. No. 13/050,765, filed Mar. 17, 2011, Yang et al.
U.S. Appl. No. 13/088,119, filed Apr. 15, 2011, Zhang et al.
U.S. Appl. No. 13/088,146, filed Apr. 15, 2011, Li et al.
U.S. Appl. No. 13/088,178, filed Apr. 15, 2011, Sun et al.
U.S. Appl. No. 13/126,748, filed Apr. 28, 2011, Tan.
U.S. Appl. No. 13/167,764, filed Jun. 24, 2011, Li, Zongwang et al.
U.S. Appl. No. 13/167,771, filed Jun. 24, 2011, Li, Zongwang et al.
U.S. Appl. No. 13/167,775, filed Jun. 24, 2011, Li, Zongwang.
U.S. Appl. No. 13/186,146, filed Jul. 19, 2011, Mathew et al.
U.S. Appl. No. 13/186,213, filed Jul. 19, 2011, Mathew et al.
U.S. Appl. No. 13/186,234, filed Jul. 19, 2011, Xia, Haitao et al.
U.S. Appl. No. 13/186,521, filed Jul. 19, 2011, Xia, Haitao et al.
U.S. Appl. No. 13/186,174, filed Jul. 19, 2011, Mathew et al.
U.S. Appl. No. 13/213,751, filed Aug. 19, 2011, Zhang, Fan et al.
U.S. Appl. No. 13/213,808, filed Aug. 19, 2011, Jin, Ming.
U.S. Appl. No. 13/220,142, filed Aug. 29, 2011, Chang, Wu et al.
U.S. Appl. No. 13/227,538, filed Sep. 8, 2011, Yang, Shaohua et al.
U.S. Appl. No. 13/227,544, filed Sep. 8, 2011, Yang, Shaohua et al.
U.S. Appl. No. 13/239,683, filed Sep. 22, 2011, Xu, Changyou.
U.S. Appl. No. 13/239,719, filed Sep. 22, 2011, Xia, Haitao et al.
U.S. Appl. No. 13/251,342, filed Oct. 2, 2011, Xia, Haitao et al.
U.S. Appl. No. 13/269,832, filed Oct. 10, 2011, Xia, Haitao et al.
U.S. Appl. No. 13/269,852, filed Oct. 10, 2011, Xia, Haitao et al.
U.S. Appl. No. 13/284,819, filed Oct. 28, 2011, Tan, Weijun et al.
U.S. Appl. No. 13/284,730, filed Oct. 28, 2011, Zhang, Fan et al.
U.S. Appl. No. 13/284,754, filed Oct. 28, 2011, Zhang, Fan et al.
U.S. Appl. No. 13/284,767, filed Oct. 28, 2011, Zhang, Fan et al.
U.S. Appl. No. 13/284,826, filed Oct. 28, 2011, Tan, Weijun et al.
U.S. Appl. No. 13/295,150, filed Nov. 14, 2011, Li, Zongwang et al.
U.S. Appl. No. 13/295,160, filed Nov. 14, 2011, Li, Zongwang et al.
U.S. Appl. No. 13/251,340, filed Oct. 3, 2011, Xia, Haitao et al.
Amer et al; Design Issues for a Shingled Write Disk System; MSST IEEE 26th Symposium; May 2010.
Bahl et al.; Optimal Decoding of Linear Codes for Minimizing Symbol Error Rate; IEEE Trans. Inform. Theory; vol. 20, pp. 284-287; Mar. 1974.
Casado et al.; Multiple-rate low-density parity-check codes with constant blocklength; IEEE Transactions on Communications, Jan. 2009, vol. 57, pp. 75-83.
Collins and Hizlan; Determinate State Convolutional Codes; IEEE Transactions on Communications; Dec. 1993.
Eleftheriou, E. et al.; Low-Density Parity-Check Codes for Digital Subscriber Lines; Proc ICC 2002, pp. 1752-1757.
Fisher, R et al.; Adaptive Thresholding [online] 2003 [retrieved on May 28, 2010] Retrieved from the Internet <URL: http//homepages.inf.ed.ac.uk/rbf/HIPR2/adpthrsh.htm.
Fossnorier, Marc P.C.; Quasi-Cyclic Low-Density Parity-Check Codes From Circulant Permutation Maricies; IEEE Transactions on Information Theory, vol. 50, No. 8, Aug. 8, 2004.
Gibson et al.; Directions for Shingled-Write and Two-Dimensional Magnetic Recording System; Architectures: Synergies with Solid-State Disks; Carnegie Mellon University; May 1, 2009.
K. Gunnam et al.; Next Generation Iterative LDPC Solutions for Magnetic Recording Storage; Invited Paper; The Asilomar Conference on Signals, Systems and Computers; Nov. 2008.

(56) References Cited

OTHER PUBLICATIONS

Yeo et al.; VLSI Architecture for Iterative Decoders in Magnetic Storage Channels; Mar. 2001, pp. 748-755, IEEE trans. Magnetics, vol. 37, No. 2.
Youn et al.; BER Performance Due to Irregularity of Row-Weight Distribution of the Parity-Check Matrix in Irregular LDPC Codes for 10-Gb/s Optical Signals; Journal of Lightweight Technology; vol. 23; Sep. 2005.
Zhong et al.; Area-Efficient Min-Sum Decoder VLSI Architecture for High-Rate QC-LDPC Codes in Magnetic Recording; pp. 1-15, Submitted 2006, not yet published.
Zhong; Block-LDPC: A Practical LDPC Coding System Design Approach; IEEE Trans. on Circuits; Regular Papers; vol. 5, No. 4, pp. 766-775, Apr. 2005.
Zhong et al.; Design of VLSI Implementation-Oriented LDPC Codes; IEEE; pp. 670-673; 2003.
Zhong et al.; High-Rate Quasi-Cyclic LDPC Codes for Magnetic Recording Channel for Low Error Floor; ISCAS, IEEE pp. 3546-3549; May 2006.
Zhong et al.; Iterative MAX-LOG-MAP and LDPC Detector/Decoder Hardware Implementation for Magnetic Read Channel; SRC TECHRON; pp. 1-4, Oct. 2005.
Zhong et al.; Joint Code-Encoder Design for LDPC Coding System VLSI Implementation; ISCAS, IEEE pp. 389-392, May 2004.
Zhong et al.; Quasi Cyclic LDPC Codes for the Magnetic Recording Channel: Code Design and VSLI Implementation; IEEE Transactions on Magnetics, v. 43, pp. 1118-1123; Mar. 2007.
Zhong; VLSI Architecture of LDPC Based Signal Detection and Coding System for Magnetic Recording Channel; Thesis, RPI, Troy, NY; pp. 1-95, May 2006.
Sari H et al; Transmission Techniques for Digital Terrestrial TV Broadcasting; IEEE Communications Magazine; IEEE Service Center; NY, NY; vol. 33, No. 2, Feb. 1995.
Selvarathinam, A.; Low Density Parity-Check Decoder Architecture for High Throughput Optical Fiber Channels; IEEE International Conference on Computer Design (ICCD '03) 2003.
Shu Lin, Ryan; Channel Codes, Classical and Modern; 2009, Cambridge University Press; pp. 213-222.
Vasic, B.; High-Rate Low-Density Parity-Check Codes Based on Anti-Pasch Affine Geometries; Proc ICC 2002, pp. 1332-1336.
Vasic, B.; High-Rate Girth-Eight Codes on Rectangular Integer Lattices; IEEE Trans. Communications, vol. 52, Aug. 2004, pp. 1248-1252.
Wang, Y et al.; A Soft Decision Decoding Scheme for Wireless COFDM with Application to DVB-T; IEEE Trans. on Consumer Elec.; IEEE Service Center; NY, NY;, vol. 50, No. 1; Feb. 2004.
Weon-Cheol Lee et al.; Vitierbi Decoding Method Using Channel State Info in COFDM System; IEEE Trans. on Consumer Elect.; IEEE Service Center; NY, NY,; vol. 45, No. 3, Aug. 1999.
Xia et al.; A Chase-GMD algorithm of Reed-Solomon codes on Perpendicular Channels; IEEE Transactions on Magnetics; vol. 42, pp. 2603-2605; Oct. 2006.
Xia et al.; Reliability-based Reed-Solomon decoding for magnetic recording channels; IEEE International Conference on Communication; pp. 1977-1981; May 2008.
K. Gunnam et al.; Value-ReUse Properties of Min-Sum for GF(q) (dated Oct. 2006) Dept. of ECE, Texas A&M University Technical Note, published about Aug. 2010.
K. Gunnam et al.; Value-ReUse Properties of Min-Sum for GF(q) (dated Jul. 2008) Dept. of ECE, Texas A&M University Technical Note, published about Aug. 2010.
K.Gunnam; Area and Energy Efficient VLSI Architectures for Low-Density Parity-Check Decoders Using an On-The-Fly Computation; dissertation at Texas A&M University, Dec. 2006.
Han & Ryan; Pinning Techniques for Low-Floor Detection/Decoding of LDPC-Coded Partial Response Channels; 5th International Symposium on Turbo Codes & Related Topics; 2008.
Hagenauer, J. et al.; A Viterbi Algorithm with Soft-Decision Outputs and its Applications, in Proc.; IEEE Globecom; pp. 47. 11-477; Dallas, TX; Nov. 1989.
Lee et al.; Partial Zero-Forcing Adaptive MMSE Receiver for DS-CDMA Uplink in Multicell Environments; IEEE Transactions on Vehicular Tech.; vol. 51, No. 5; Sep. 2002.
Lin et al.; An efficient VLSI Architecture for non-binary LDPC decoders—IEEE Transaction on Circuits and Systems II, vol. 57, Issue 1 (Jan. 2010) pp. 51-55.
Mohsenin et al.; Split Row: A Reduced Complexity, High Throughput LDPC Decoder Architecture; pp. 1-6.
Moon et al.; Pattern-dependent Noise Prediction in Signal-dependent Noise; IEEE JSAC, vol. 19, No. 4; pp. 730-743; Apr. 2001.
Perisa et al.; Frequency Offset Estimation Based on Phase Offsets Between Sample Correlations; Dept. of Info. Tech. University of ULM; 2005.
Unknown; Auto Threshold and Auto Local Threshold; [online] [retrieved May 28, 2010 from the Internet: <URL:http://www.dentristy.bham.ac.uk/landinig/software/autoth.

* cited by examiner

STORAGE MEDIA INTER-TRACK INTERFERENCE CANCELLATION

CROSS-REFERENCE TO RELATED APPLICATIONS

This application is a continuation-in-part, and claims the benefit of the filing date, of U.S. patent application Ser. Nos. 13/186,174, 13/186,197 and 13/186,213 all filed Jul. 19, 2011, 13/250,246 filed Sep. 30, 2011, and 13/460,204 filed Apr. 30, 2012, the teachings of all of which are incorporated herein in their entireties by reference.

The subject matter of this application is related to U.S. patent application Ser. No. 13/591,980 filed on Aug. 22, 2012, Ser. No. 13/591,888 filed on Aug. 22, 2012, and Ser. No. 13/592,023 filed on Aug. 22, 2012, the teachings of all of which are incorporated herein in their entireties by reference.

BACKGROUND

Magnetic and optical data storage devices, such as hard disk drives (HDDs), tape drives and compact disk drives, use heads to read and write information to and from a storage media. In a typical rotating storage system, data is stored on a disk in a series of adjacent concentric tracks. In a magnetic storage device, the tracks are accessed by read and write heads that move radially over the disk under control of a head-positioning servo mechanism so that the heads can be selectively positioned over a specific track. Once the head is aligned over a track, the servo mechanism causes the heads to ideally follow a center line of the selected track during a read or write operation.

Digital data is written to the storage media in a predetermined format using a write head that induces a magnetic field with sufficient amplitude to record on the magnetic material of the storage device. The magnitude and direction of the magnetic field is modulated to encode information into the magnetic surface of the storage device. The data might then be read as necessary by a read head for processing, for example, by a host computer. In read mode, as the magnetic storage surface moves across the gap in the head, the magnetic field of the storage surface is detected, and a voltage is induced in the head. The analog voltage signal is processed to obtain digital data. For example, the analog voltage might be amplified, filtered, and provided to an analog-to-digital converter (ADC) where the signal is digitized and passed through an equalizer and decoded.

As storage media storage capacities have increased, the data tracks are closer in proximity, increasing storage density and capacity of the media. However, as adjacent data tracks become closer, crosstalk between the adjacent tracks, Inter-Track Interference (ITI), might become increasingly significant, such that data in a desired track cannot be read, leading to data corruption. For example, the read and write heads might be positioned over the storage media by various types of alignment marks that might typically be recorded on the recording disk surface to track and adjust the position of the read and write heads. ITI might be the result of write head positioning error during a write operation, or read head positioning error during a read operation.

In order to detect ITI, typical systems might record tracking marks in one or both adjacent tracks, and read the marks when reading the desired track. However, such ITI cancellation requires seeking to the side tracks and waiting for the media to rotate to the position of the tracking marks. Thus, ITI cancellation could introduce large system latency to read data from the storage media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of cancelling inter-track interference (ITI) from one or more sectors read from a desired track of a storage medium. A read channel reads sectors in a desired track of the storage medium. A decoder of the read channel decodes the read sectors, and if the read sectors are incorrectly recovered from the storage medium, selected sectors of a first adjacent track and a second adjacent track are read. An ITI canceller of the read channel estimates ITI in the read sectors of the desired track corresponding to the selected sectors of each adjacent track and subtracts the estimated ITI of each adjacent track from the data for the sectors of the desired track, providing updated sector data. The ITI cancelled data is replayed to the decoder, which decodes the ITI cancelled data and provides the decoded ITI cancelled data as output data of the read channel.

BRIEF DESCRIPTION OF THE DRAWING FIGURES

Aspects, features, and advantages of described embodiments will become more fully apparent from the following detailed description, the appended claims, and the accompanying drawings in which like reference numerals identify similar or identical elements.

DETAILED DESCRIPTION

Described embodiments provide a method of cancelling inter-track interference (ITI) from one or more sectors read from a desired track of a storage medium. A read channel reads sectors in a desired track of the storage medium. A decoder of the read channel decodes the read sectors, and if the read sectors are incorrectly recovered from the storage medium, selected sectors of a first adjacent track and a second adjacent track are read. An ITI canceller of the read channel estimates ITI in the read sectors of the desired track corresponding to the selected sectors of each adjacent track and subtracts the estimated ITI of each adjacent track from the data for the sectors of the desired track, providing updated sector data. The ITI cancelled data is replayed to the decoder, which decodes the ITI cancelled data and provides the decoded ITI cancelled data as output data of the read channel.

TABLE 1

| | | | |
|---|---|---|---|
| ITI | Inter-Track Interference | IC | Integrated Circuit |
| AMBA | Advanced Microcontroller Bus Architecture | APB | Advanced Peripheral Bus |
| AHB | Advanced High-performance Bus | AXI | Advanced eXtensible Interface |
| NRZ | Non-Return to Zero | HDD | Hard Disk Drive |
| AFE | Analog Front End | FIR | Finite Impulse Response |
| HDC | Hard Disk Controller | SMR | Shingled Magnetic Recording |
| ECC | Error Correction Code | EDC | Error Detection Code |
| VGA | Variable Gain Amplifier | AEQ | Analog EQualizer |
| DFE | Decision Feedback Equalizer | FFE | Feed Forward Equalizer |
| ISI | Inter-Symbol Interference | | |

Figure 1A:
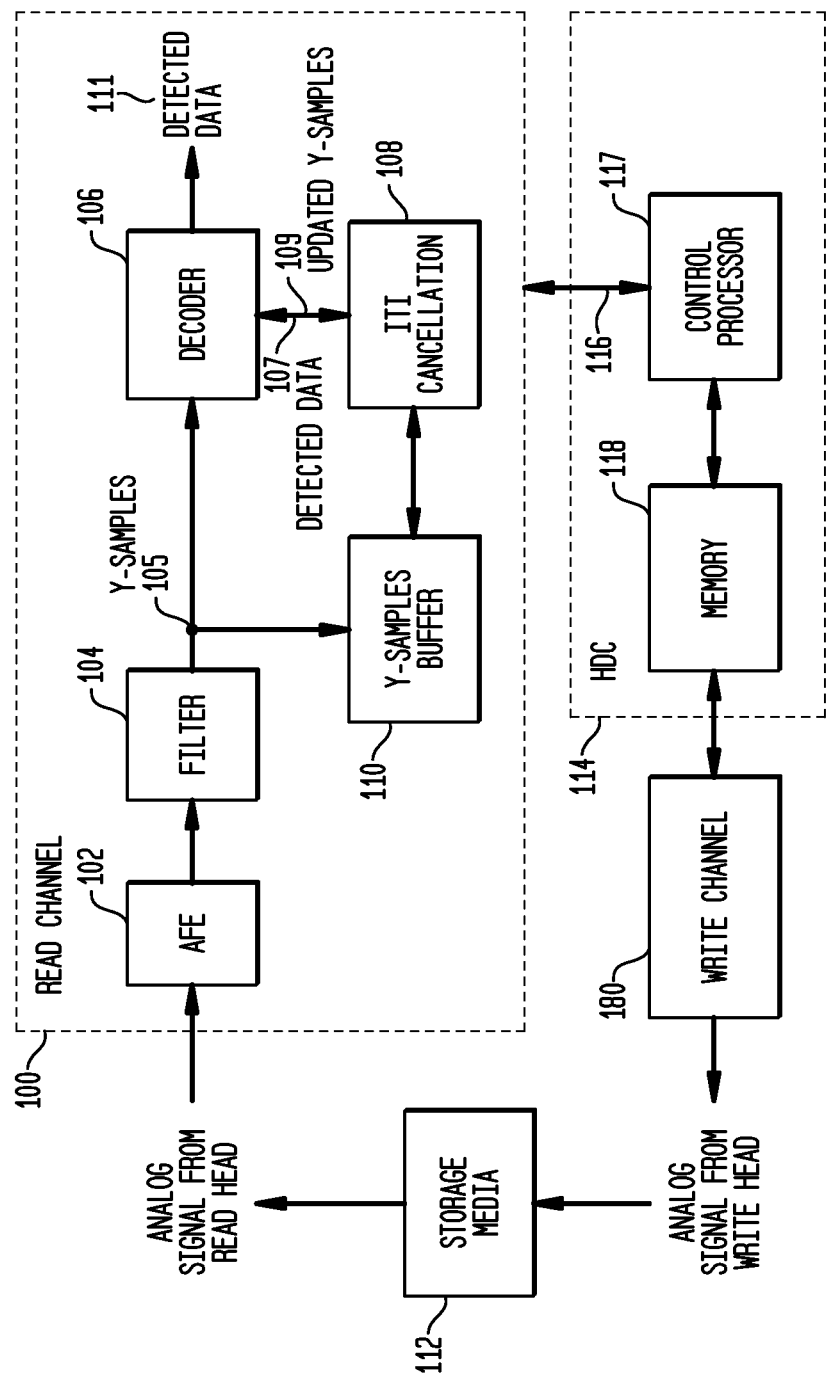
FIG. 1A shows a block diagram of a read channel incorporating inter-track interference (ITI) cancellation in accordance with described embodiments.

FIG. 1A shows a block diagram of read channel 100 for reading data from storage media 112. Read channel 100 might include a physical transmission medium, such as a backplane, one or more coaxial cables, one or more twisted pair copper wires, one or more radio frequency (RF) channels, or one or more optical fibers coupled to the drive head in the magnetic recording system. Described embodiments might be employed in serializer-deserializer (SERDES) communication systems or alternative communications systems employing a transmitter and a receiver communicating over a communication channel. Although described herein as a magnetic storage device such as a hard disk drive (HDD), storage media 112 might be implemented as any storage media having inter-track interference (ITI), such as magnetic tapes, or optical storage media such as compact disks. As shown, read channel 100 receives an analog signal from a read head (not shown) that reads data from storage media 112. The analog signal represents an amplitude of a magnetic field induced in the read head by one or more tracks of storage media 112 (e.g., the desired track, N, and ITI from one or more adjacent tracks, e.g., N+1, N−1, etc.).

Figure 2:
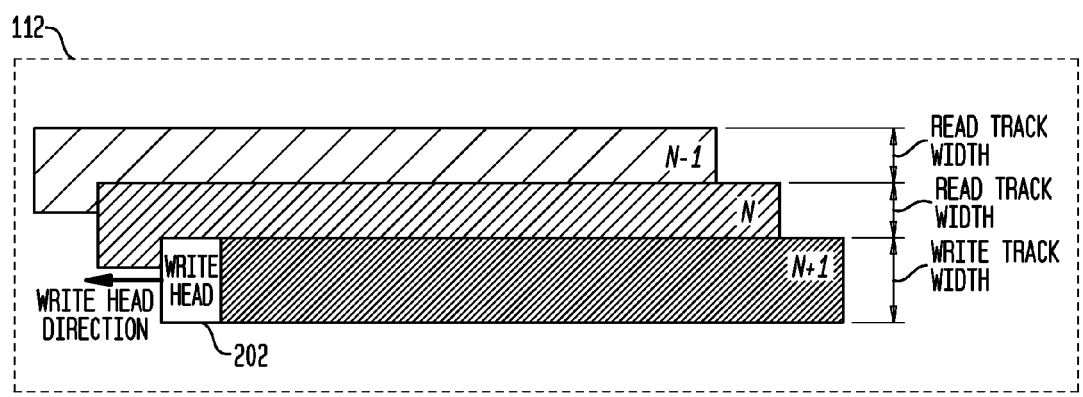
FIG. 2 shows an exemplary diagram of track arrangement on a storage media in communication with the read channel of FIG. 1A.

In some embodiments, storage media 112 might store data employing shingled magnetic recording (SMR). SMR increases the storage densities beyond the capacity limits of traditional hard disk drives HDDs employing conventional perpendicular recording. SMR generally requires fewer technology changes to the recording technology than Bit-Patterned Magnetic Recording (BPMR), Energy Assisted Magnetic Recording (EAMR), Heat Assisted Magnetic Recording (HAMR), and Thermally Assisted Magnetic Recording. In SMR drives, track density is increased by writing tracks successively in an overlapped shingled manner as shown in FIG. 2. As shown in FIG. 2, SMR storage media 112 includes a number of written tracks, shown generally as tracks N−1, N and N+1. As shown in FIG. 2, track N−1 is written first, followed by track N, followed by track N+1, and so on, by write head 202 in a given direction on SMR media 112. After the shingled tracks are written, track data is stored in an area ("read track width") that is smaller than the original write area ("write track width"). Thus, in SMR, relatively wider write heads that cover one or more shingled tracks might be employed.

Figure 3A:
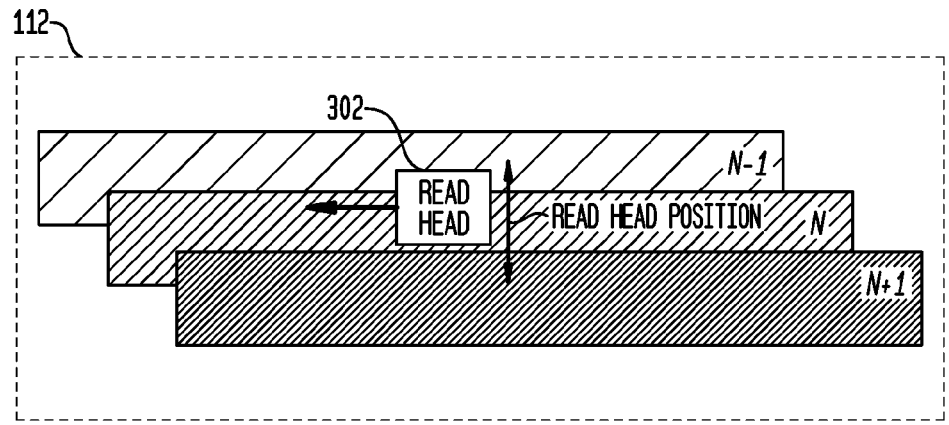
FIG. 3A shows an exemplary diagram of track arrangement on a storage media in communication with the read channel of FIG. 1A.
Figure 3B:
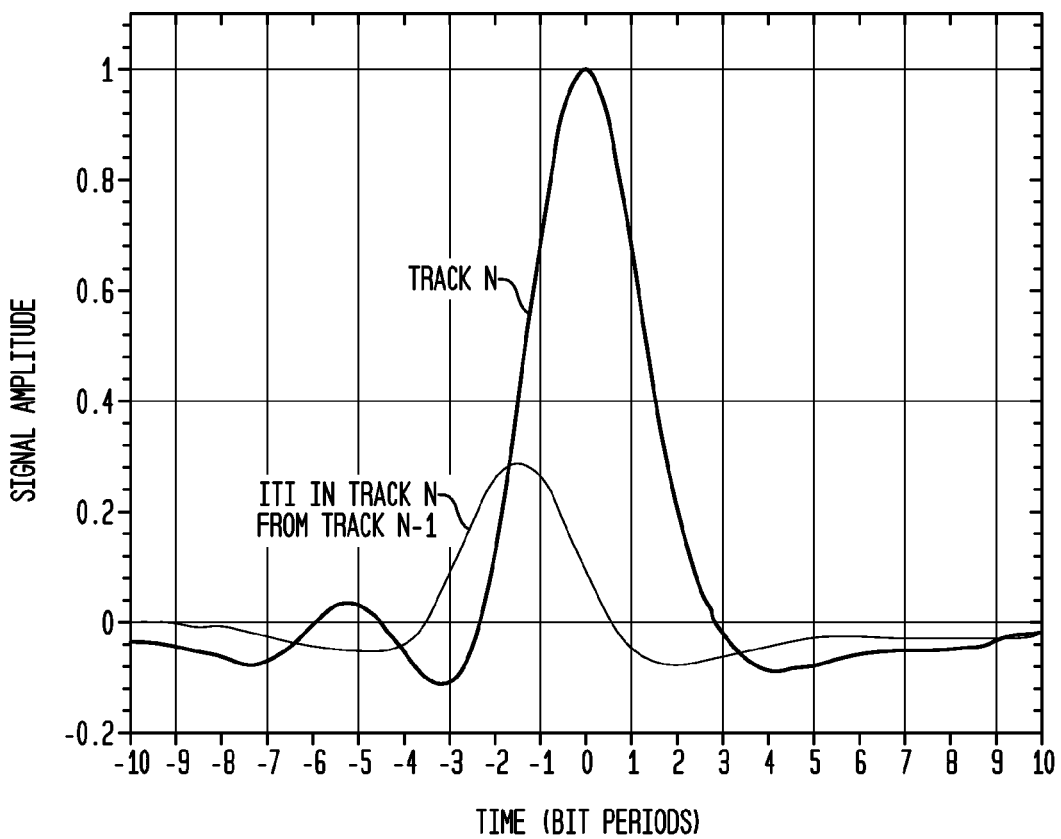
FIG. 3B shows an exemplary plot of read channel signal amplitude of a desired track and ITI from a non-desired track in the read channel of FIG. 1A.

However, due to the small read track width, significant ITI from adjacent (or neighboring) tracks might occur during read operations, especially when a read head is employed that is not significantly narrower than the width of the shingled tracks. As shown in FIG. 3A, ITI might occur when the width of read head 302 is greater than the pitch of shingled tracks N−1, N and N+1 on the SMR disk. ITI might also occur due to position errors or offset of read head 302, for example when the read head is not precisely centered over the desired shingled read track (e.g., track N in the exemplary case shown in FIG. 3A). In such cases, read head 302 might receive signals from one or more adjacent (or neighboring) tracks, in addition to the signal from the desired read track, such as shown in the exemplary case of FIG. 3B. As shown in FIG. 3B, read head 302 might receive a first, desired signal, from the desired read track (track N), but might also receive additional, undesired ITI signals, from one or more tracks adjacent to or neighboring the desired read track. For example, as shown in FIG. 3B, an ITI signal is received from neighboring track N−1 that distorts the signal read from track N.

Referring back to FIG. 1A, the received analog signal from the read head is provided to analog front end (AFE) 102, which might filter or equalize the analog signal, for example by a variable gain amplifier (VGA) to amplify the analog signal and/or a continuous time analog equalizer (AEQ). AFE 102 might also provide sampling of the received analog signal to provide a digital signal to filter 104 that might further condition the signal. In some embodiments, filter 104 might be a finite impulse response (FIR) filter. Other signal conditioning, such as decision feedback equalization (DFE) and feed forward equalization (FFE) (not shown) might employed to reduce intersymbol interference (ISI) between one or more adjacent symbols of the received signal. The filtered sample values ("Y-samples" 105) are provided to iterative decoder 106 and inter-track interference (ITI) cancellation module 108 via Y-samples buffer 110.

Iterative decoder 106 receives Y-samples 105 that correspond to the data read from the read track of SMR media 112. Iterative decoder 106 decodes, for example by performing error recovery, one or more sectors read from one or more desired read tracks of SMR media 112. In some embodiments, iterative decoder 106 might average the Y-sample values over multiple reads of given sector(s) of desired read track(s). In some other embodiments, iterative decoder 106 might select a relative "most reliable" set of Y-samples from a group of Y-sample sets corresponding to multiple reads of given sector(s) of desired read track(s). If iterative decoder 106 successfully decodes the sector(s), iterative decoder 106 provides the detected data (detected data 111) as the read data for further processing (e.g., to be provided to a host device).

Figure 1B:
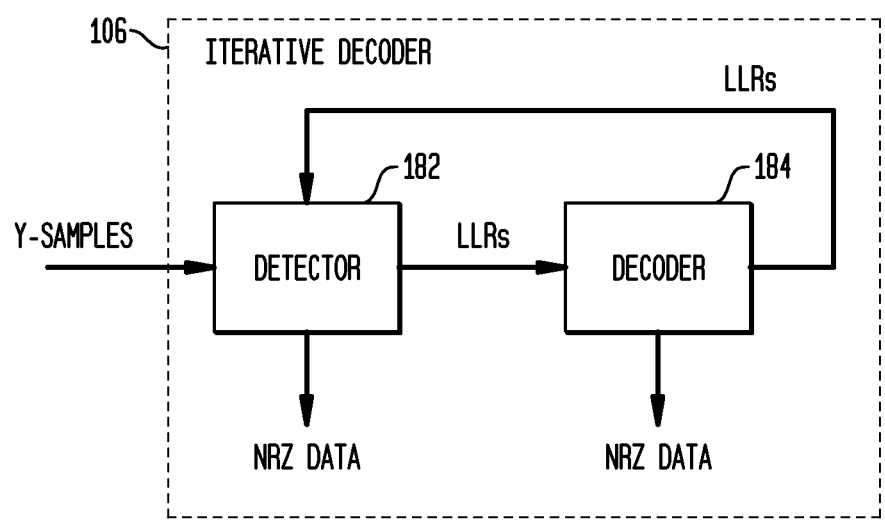
FIG. 1B shows a block diagram of an iterative decoder of the read channel of FIG. 1A.

FIG. 1B shows additional detail of iterative decoder 106. Iterative decoder 106 might include detector 182 and decoder 184. In some embodiments, detector 182 might be implemented as a soft-output Viterbi detector or a maximum a posteriori (MAP) detector, and decoder 184 might be implemented as a Low Density Parity Check (LDPC) decoder or a Turbo decoder. Log-likelihood ratios (LLRs) are probability measures for detected bits that might be computed by detector 182 and decoder 184. The LLRs might be calculated based on provided Y-samples and previous LLRs (if available). For example, as shown in FIG. 1B, detector 182 provides determined LLRs to decoder 184, and decoder 184 provides determined LLRs back to detector 182. Each of detector 182 and decoder 184 might provide NRZ data outputs. For example, in a so-called global iteration of iterative decoder 106, detector 182 employs LLRs computed by decoder 184, and in a so-called local iteration, decoder 184 performs internal decoding iterations to compute updated LLRs based on the input LLRs from detector 182. For each global iteration by detector 182 and decoder 184, decoder 184 might typically perform several local iterations. For example, in some embodiments (a "0.5" iteration), NRZ data might be provided as the output of iterative detector 106 after a first pass through detector 182 without any global iteration(s) with detector 184. In other embodiments (a "1 global" iteration), NRZ data might be provided as the output of iterative detector 106 after one pass through detector 182 and decoder 184. As described, to perform 1 global iteration, decoder 184 might perform multiple local iterations to provide updated LLRs to detector 182.

If iterative decoder 106 fails to successfully decode the sector(s), iterative decoder 106 provides the detected data (detected data 107) to ITI cancellation module 108 to perform ITI cancellation. Thus, ITI cancellation might typically be performed if typical decoding and other decoding retry mechanisms fail to successfully decode a sector. Thus, in described embodiments, ITI cancellation module 108 is a sector-based offline error recovery module.

ITI cancellation module 108 receives data from the desired track, N, and one or more of the adjacent (side) tracks. Equalized Y-samples 105 corresponding to one or more failing target sectors on track N are stored in Y-samples buffer 110. In some embodiments, Y-samples buffer 110 might store one or more sectors (e.g., either 512B or 4 kB sectors). Non-Return-to-Zero (NRZ) data for adjacent sectors in tracks N−1 and N+1 might be received from iterative decoder 106 by reading storage media 112 using a raw-data mode. The side track data might take a significant amount of time to collect due to seeking read head 302 to position over the side tracks and waiting for the media to rotate to the correct position for the corresponding sectors. ITI cancellation module 108 estimates, calculates and cancels ITI in the equalized Y-samples for the failed sector(s) on track N using the NRZ data bits from corresponding adjacent sectors in adjacent tracks N−1 and N+1. ITI cancellation module 108 might store ITI-cancelled Y-samples (updated Y-samples 109) in Y-samples buffer 110 and then provide updated Y-samples 109 to iterative decoder 106. Iterative decoder restarts the iterative decoding process using updated Y-samples 109, and provides ITI-cancelled detected data 111 as output data, for example to a host device (not shown). Detected data 111 might be Q-bit data corresponding to one or more partial or complete sectors recovered from storage media 112.

In described embodiments, read channel 100 might be coupled to the host device by a Small Computer System Interface ("SCSI") link, a Serial Attached SCSI ("SAS") link, a Serial Advanced Technology Attachment ("SATA") link, a Universal Serial Bus ("USB") link, a Fibre Channel ("FC") link, an Ethernet link, an IEEE 802.11 link, an IEEE 802.15 link, an IEEE 802.16 link, a Peripheral Component Interconnect Express (PCI-E) link, or any other similar interface for connecting a peripheral device to a host device.

Although shown in FIG. 1A as being included in read channel 100, ITI cancellation module 108 might be included in a separate HDD controller ("HDC") shown as HDC 114. HDC might be coupled to one or more memories 118 that buffer data being transferred between storage media 112 and the host device. HDC 114 might include control processor 117, which, in some embodiments might include ITI cancellation module 108. Communications between read channel 100 and HDC 114 might be by one or more channels or busses 116. For example, data read from the storage media might be provided to processor 117 of HDC 114 over an NRZ data bus, and Y-samples for one or more sectors might be provided to HDC 114 from Y-samples buffer 110 by bus of processor 117. In described embodiments, processor 117 might be implemented as a Pentium®, Power PC® or ARM processor (Pentium® is a registered trademark of Intel Corporation, ARM processors are by ARM Holdings, plc, and Power PC® is a registered trademark of IBM). For example, if processor 117 is an ARM processor, bus 116 might include an Advanced Microcontroller Bus Architecture (AMBA) bus, such as an Advanced Peripheral Bus (APB) or an Advanced High-performance bus (AHB).

Thus, in described embodiments employing firmware ITI cancellation, Y-samples for track N might be transferred from read channel 100 to control processor 117 using an APB or AHB bus. NRZ data for the side tracks (N−1 and/or N+1) might be transferred to control processor 117 using the NRZ data bus. Optionally, NRZ data for desired track N might also be transferred to control processor 117 for error-based ITI estimation. The NRZ data might typically be in raw-data format that includes data bits, parity bits, formatting bits or other control data. As shown in FIG. 1A, the Y-samples and NRZ data might be stored in a buffer (e.g., memory 118) that might be either internal or external to HDC 114. Control processor 117 might transfer ITI-cancelled Y-samples back to read channel 100 from HDC 114 using bus(es) 116 (e.g., an APB or AHB bus). The ITI cancelled Y-samples might be stored in Y-sample buffer 110 such that HDC 114 initiates a replay of the ITI cancelled sector(s) such that iterative decoder 106 process the new ITI-cancelled Y-samples to provided detected data 111.

Since, in described embodiments, ITI cancellation module 108 employs the NRZ data for at least one of adjacent tracks N−1 and N+1, media 112 might generally make multiple disk revolutions in order for ITI cancellation module 108 to recover failing sector(s) of desired track N. For example, three disk revolutions might be needed to read and transfer data samples for track N and the NRZ data for adjacent tracks N−1 and N+1 from media 112 to ITI cancellation module 108. In some embodiments, for example when ITI cancellation is performed by firmware operating on processor 117, the transfer of data from media 112 to ITI cancellation module 108 might take additional disk revolutions. Additional revolutions of media 112 might occur during ITI cancellation before iterative decoder 106 restarts processing on the updated Y-samples.

Figure 4:
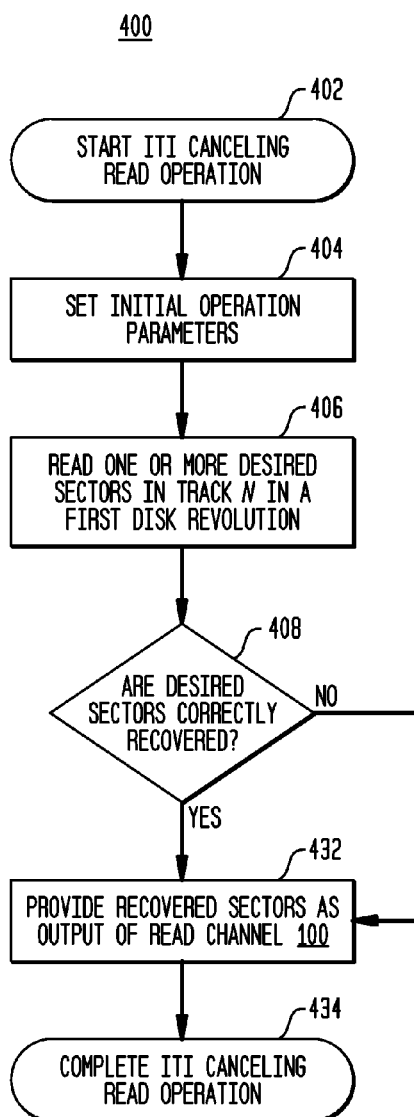
FIG. 4 shows a flow diagram of an ITI cancellation routine in accordance with described embodiments.
Figure 4:
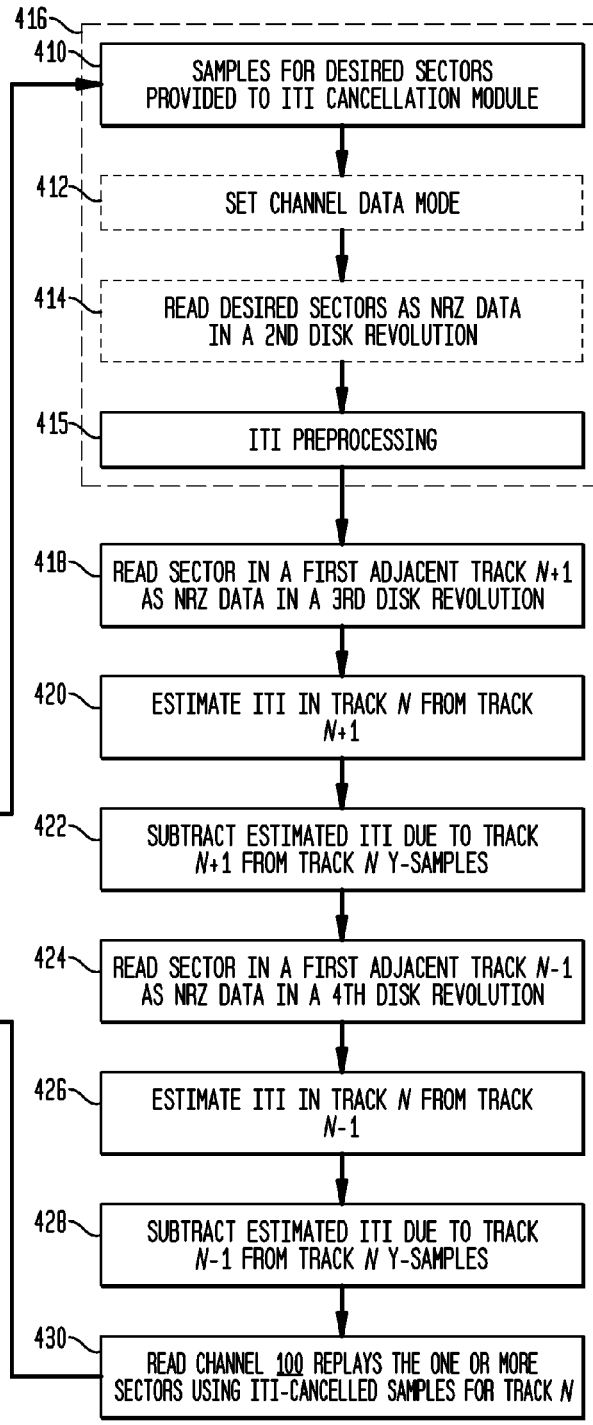
Figure 5:
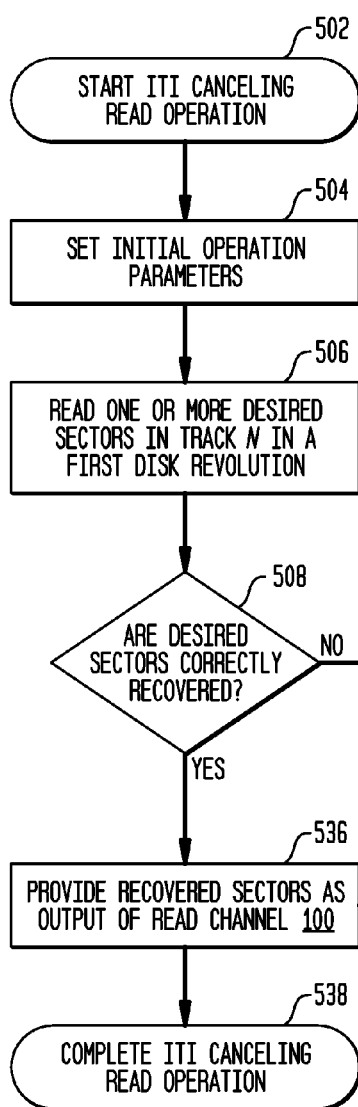
FIG. 5 shows a flow diagram of an ITI cancellation routine in accordance with described embodiments.
Figure 5:
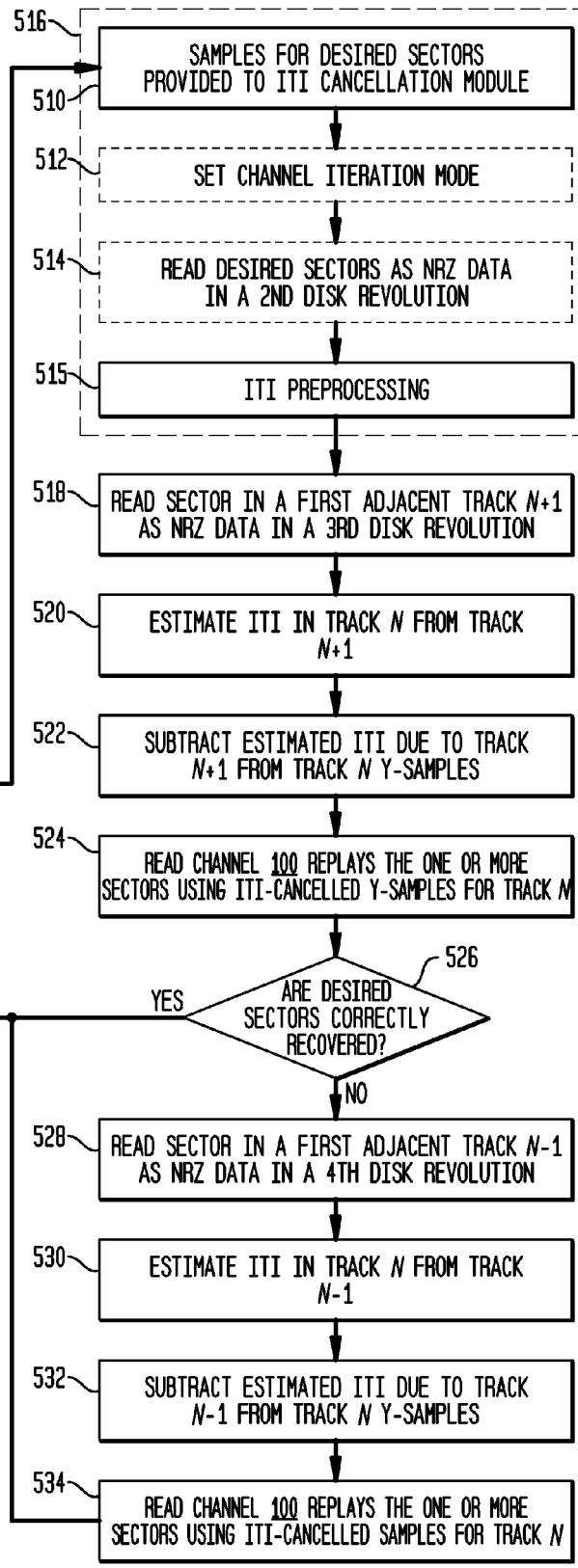

In many SMR implementations, it might be known which side track (e.g., either N+1 or N−1) has dominant interference. Thus, in many instances, for described embodiments, there is a high likelihood that the desired data from track N might be successfully recovered after cancelling interference from only the dominant side track. If the data cannot be recovered after cancellation of interference from the dominant side track, cancellation of interference from the non-dominant side track might be performed. FIG. 4 shows an exemplary flow diagram for an ITI cancellation process that cancels ITI from both side tracks. FIG. 5 shows an exemplary flow diagram for an ITI cancellation process that cancels ITI from the dominant side track first, and then optionally cancels ITI from the non-dominant side track if necessary.

FIG. 4 shows an exemplary flow diagram of ITI canceling read operation 400. At step 402, read channel 100 starts read operation 400. At step 404, read channel 100 sets one or more initial operation parameters for the read operation. For example, read channel 100 might be set to a retry mode to re-read the target sector(s) and adjacent sectors, and a global limit of retries and a local number of retries might be set. Retry mode might be a data recovery mode wherein read channel 100 is required to retry recovering a sector that failed in one or more previous attempts, and a limit of global and/or local iterations might be set that is different from a normal read mode. At step 406, Y-sample data for one or more desired sectors of track N is provided by filter 104 to iterative decoder 106. At step 408, if iterative decoder 106 correctly recovers the desired data from track N, then process 400 continues to step 432 without performing ITI cancellation. At step 432, the recovered data (e.g., detected data 111) is provided as the output data of read channel 100, for example to a host device (not shown in FIG. 1A). At step 434, read operation 400 completes.

If at step 408 iterative decoder 106 does not correctly recover the desired data from track N, then process 400 continues to step 410 to being ITI cancellation. At step 410, ITI cancellation module 108 receives Y-samples 105 and detected data 107 from iterative decoder 106 via Y-samples buffer 110.

In some embodiments, the Y-samples and NRZ data for the desired sector(s) of track N are obtained during two separate reads (e.g., at step 406 and step 414) in two separate disk revolutions. In such embodiments, at step 412, read channel 100 is set to read the desired sectors of media 112 at step 414 in a raw-data mode in a second revolution of media 112 (e.g., revolution 602 of FIG. 6). The raw-data mode might be a data recovery mode where the data bits recovered from media 112 and sent to the host device include data bits, parity bits, formatting bits and other control data. Reading the desired sector(s) of track N in two reads allows different read channel parameters to be set for the two separate reads (e.g., at step 412). For example, in the first read at step 406, Y-samples might be captured with a maximum number of global and local iterations in iterative decoder 106 to increase the likelihood that the sector is recovered successfully. If the sector can be recovered without errors, no ITI cancellation is performed. If the sector is not recovered error-free, NRZ data is captured in a second read (e.g., at step 414) with a lower number of global or local iterations, for example after 0.5 iterations. As described herein, employing 0.5 iterations of iterative decoder 106 captures NRZ data at the output of detector 182 without performing any global iterations between detector 182 and decoder 184. Since the sector(s) could not be read without errors, performing further decoding iterations might introduce additional errors into the NRZ data. Since this NRZ data is used for ITI cancellation, it is desirable to keep the number of errors in the NRZ data as low as possible. The optional nature of steps 412 and 414 is indicated by the dashed lines.

In other embodiments, the Y-samples and NRZ data for the desired sector(s) of track N might be obtained during the same read (revolution), for example at step 406. This allows one fewer disk revolution and, thus, faster data recovery time. On the other hand, the Y-samples and NRZ data would be captured with the same read channel parameters (e.g., the same number of local and global iterations of iterative decoder 106), which, as described, could introduce additional errors into the NRZ data.

In some embodiments, ITI cancellation module 108 might employ one of two approaches for estimating ITI (e.g., at steps 420 and 426 of FIG. 4 and steps 520 and 530 of FIG. 5): (1) Y-sample based ITI cancellation and (2) error based ITI cancellation. In embodiments employing Y-sample based ITI cancellation, Y-samples for track N are correlated with NRZ data from the adjacent track (N+1 or N−1) without using NRZ data for track N. In embodiments employing error-sample based ITI cancellation, error samples for track N are correlated with NRZ data from the adjacent track (N+1 or N−1). The error samples are computed based on NRZ data for track N. Error samples are the difference between actual and ideal Y-sample values, where ideal Y-samples are computed using the NRZ data and channel information (such as partial response target or generalized partial response target). For example, ITI estimation and cancellation based on correlation of Y-samples 105 with detected data might be employed, such as described in related U.S. patent application Ser. Nos. 13/186,174, 13/186,197 and 13/186,213, all filed on Jul. 19, 2011, and incorporated by reference herein.

As shown in FIG. 4, steps 410, 412, 414 and 415 might collectively be referred to as "ITI preprocessing," as indicated by dashed line 416. After at least one of the NRZ data and Y-samples are read for the desired track (e.g., step 406) the read data might optionally begin processing at step 415 that might typically take a substantial time (e.g., on the order of a revolution of media 112). At step 415, ITI cancellation module 108 generates, based on the NRZ data for track N read at step 414, estimated ideal Y-sample values (e.g., ideal Y-sample values if there was no intersymbol interference (ISI) or other noise). The estimated ideal Y-sample values are compared with the actual Y-sample values read at step 410 to generate an estimated error signal representing a deviation between each Y-sample from the estimated ideal Y-sample value. Step 415 might typically be performed prior to collecting data from an adjacent track (e.g., at step 418). For example, step 415 might be performed while waiting for a next revolution of the disk to complete to perform the read operation of step 418. As described, step 415 is optionally performed. For example, alternative embodiments might wait for all data to be gathered (e.g., steps 410, 414 and 424) before performing any processing.

Figure 6:
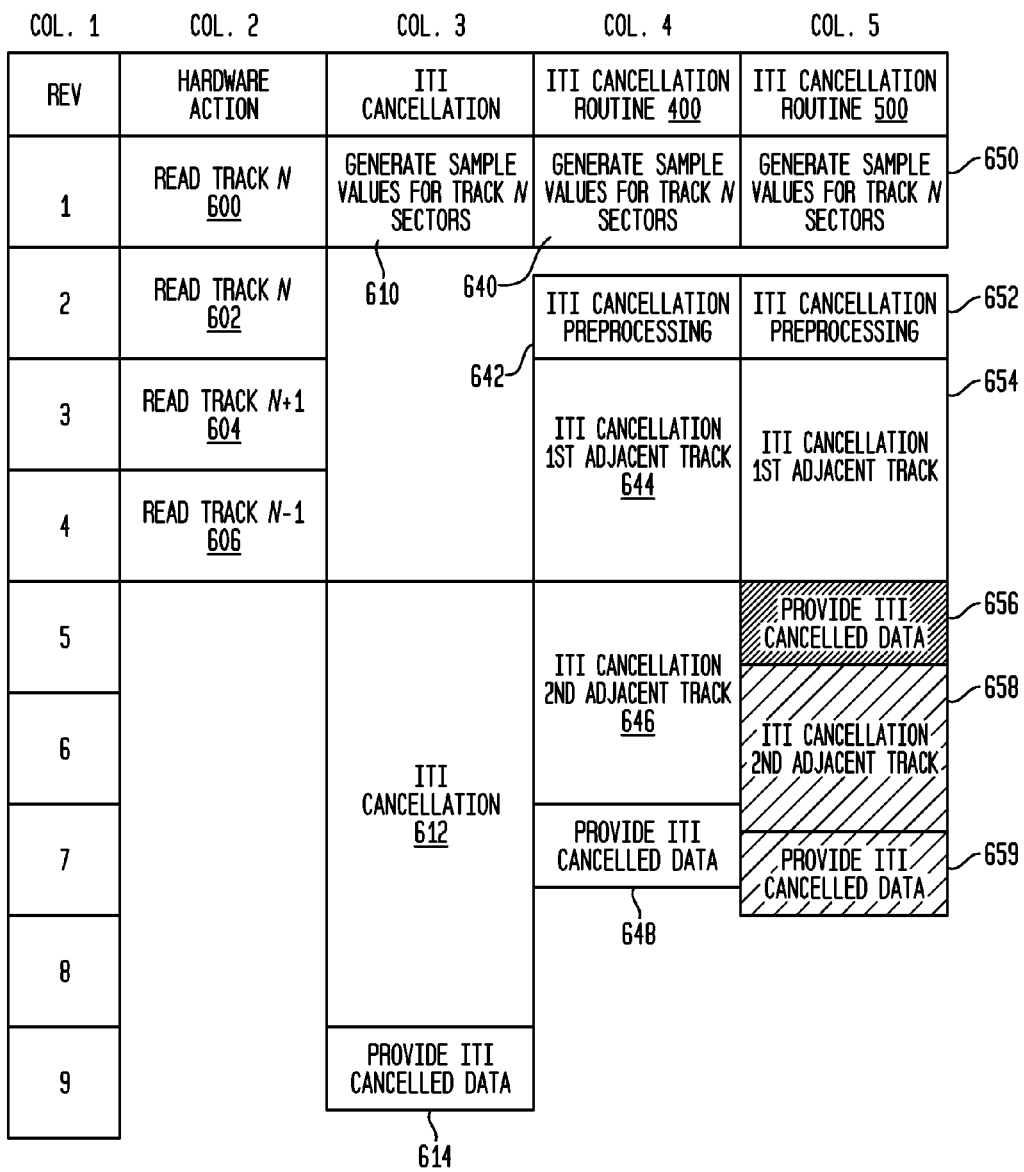
FIG. 6 shows a table of the logical progress of the ITI cancellation routines of FIGS. 4 and 5 in relation to disk revolutions, in accordance with described embodiments.

At step 418, ITI cancellation module 108 reads, via read channel 100, data for a first side track (e.g., the dominant side track, indicated as track "N+1" in the example shown in FIG. 4) in a third revolution of media 112 (e.g., revolution 604 of FIG. 6). When recovering the NRZ data for the adjacent sectors at step 418, read channel 100 is set to raw-data mode when recovering the NRZ data. Thus, after step 418, when the data is read from a first adjacent track (e.g., the dominant side track, indicated as track "N+1" in the example shown in FIG. 4), some ITI processing has already been completed without waiting for data from either side track to be read from media 112.

At step 420, ITI cancellation module 108 estimates ITI from track N+1 in track N. In embodiments employing error based ITI cancellation, the ITI is determined based on the NRZ data for track N+1 (e.g., read at step 418) and the estimated error signal (e.g., generated at step 415 based on the NRZ data for track N and characteristics of read channel 100) to determine how much error (e.g., ITI) was caused by adjacent track N+1. Each point of the error signal is correlated with the n closest NRZ bits of the adjacent track to determine how much each bit interfered with track N to produce an interference profile of estimated ITI. In embodiments employing Y-samples based ITI cancellation, Y-samples for track N are correlated with NRZ data from the adjacent track N+1 without using NRZ data for track N.

At step 422, ITI cancellation module 108 subtracts the estimated ITI for track N+1 from the Y-samples for track N. At step 424, ITI cancellation module 108 reads, via read channel 100, data for a second side track (e.g., the non-dominant side track, indicated as track "N−1" in the example shown in FIG. 4) in a fourth revolution of media 112 (e.g., revolution 606 of FIG. 6). When recovering the NRZ data for the adjacent sectors at step 424, read channel 100 is set to raw-data mode when recovering the NRZ data.

At step 426, ITI cancellation module 108 estimates ITI from track N−1 in track N. In embodiments employing error based ITI cancellation, the ITI is determined based on the NRZ data for track N−1 (e.g., read at step 424), and the estimated error signal generated at step 415 based on the Y-samples for track N (e.g., read at step 406), the NRZ data for track N (e.g., read at step 414) and characteristics of read channel 100 to determine how much error (e.g., ITI) was caused by adjacent track N−1. Each point of the error signal is correlated with the n closest NRZ bits of the adjacent track to determine how much each bit interfered with track N to produce an interference profile of estimated ITI. In embodiments employing Y-samples based ITI cancellation, Y-samples for track N are correlated with NRZ data from the adjacent track N+1 without using NRZ data for track N.

At step 428, ITI cancellation module 108 subtracts the estimated ITI for track N−1 from the NRZ data for track N. At step 430, ITI cancellation module 108 replays the sector(s) for track N using the ITI-cancelled data to iterative decoder 106 (e.g., as updated Y-samples 109) for decoding into detected data 111. Thus, ITI processing is further separated such that cancellation for a first side track (e.g., the dominant side track) has already been completed without waiting for data from the other side track to be read from media 112. Thus, ITI cancellation processing occurs in parallel with read head 302 seeking to position over the side tracks and media 112 completing disk revolutions.

In some embodiments, while the NRZ data for the adjacent sectors read at steps 418 and 424 typically includes only media bits (e.g., user data bits, parity bits, RLL bits or ECC bits, etc.), the Y-samples in buffer 110 might also include additional supporting bits such as synch-mark or fragment bits that might be employed to align Y-sample data in buffer 110 with NRZ data from adjacent tracks.

FIG. 5 shows an exemplary flow diagram of ITI canceling read operation 500. At step 502, read channel 100 starts read operation 500. At step 504, read channel 100 sets one or more initial operation parameters for the read operation. For example, read channel 100 might be set to retry mode to re-read the target sector(s) and adjacent sectors, and a global limit of retries and a local number of retries might be set. At step 506, Y-sample data for one or more desired sectors of track N is provided by filter 104 to iterative decoder 106. At step 508, if iterative decoder 106 correctly recovers the desired data from track N, then process 500 continues to step 536 without performing ITI cancellation. At step 536, the recovered data (e.g., detected data 111) is provided as the output data of read channel 100, for example to a host device (not shown in FIG. 1A). At step 538, read operation 500 completes.

If at step 508 iterative decoder 106 does not correctly recover the desired data from track N, then process 500 continues to step 510 to begin ITI cancellation. At step 510, ITI cancellation module 108 receives Y-samples 105 and detected data 107 from iterative decoder 106 and stores them to buffer 110.

In some embodiments, the Y-samples and NRZ data for the desired sector(s) of track N are obtained during two separate reads (e.g., at step 506 and step 514) in two separate disk revolutions. In such embodiments, at step 512, read channel 100 is set to read the desired sectors of media 112 at step 514 in a raw-data mode in a second revolution of media 112 (e.g., revolution 602 of FIG. 6). The raw-data mode might be a data recovery mode where the data bits recovered from media 112 and sent to the host device include data bits, parity bits, formatting bits and other control data. Reading the desired sector(s) of track N in two reads allows different read channel parameters to be set for the two separate reads (e.g., at step 512). For example, in the first read at step 506, Y-samples might be captured with a maximum number of global and local iterations in iterative decoder 106 to increase the likelihood that the sector is recovered successfully. If the sector can be recovered without errors, no ITI cancellation is performed. If the sector is not recovered error-free, NRZ data is captured in a second read (e.g., at step 514) with a lower number of global or local iterations, for example after 0.5 iterations. As described herein, employing 0.5 iterations of iterative decoder 106 captures NRZ data at the output of detector 182 without performing any global iterations between detector 182 and decoder 184. Since the sector(s) could not be read without errors, performing further decoding iterations might introduce additional errors into the NRZ data. Since this NRZ data is used for ITI cancellation, it is desirable to keep the number of errors in the NRZ data as low as possible. The optional nature of steps 512 and 514 is indicated by the dashed lines.

In other embodiments, the Y-samples and NRZ data for the desired sector(s) of track N might be obtained during the same read (revolution), for example at step 506. This allows one fewer disk revolution and, thus, faster data recovery time. On the other hand, the Y-samples and NRZ data would be captured with the same read channel parameters (e.g., the same number of local and global iterations of iterative decoder 106), which, as described, could introduce additional errors into the NRZ data.

Similarly as described in regard to FIG. 4, some embodiments of ITI cancellation module 108 might employ one of two approaches for estimating ITI (e.g., steps 520 and 530 of FIG. 5): (1) Y-sample based ITI cancellation and (2) error based ITI cancellation. In embodiments employing Y-sample based ITI cancellation, Y-samples for track N are correlated with NRZ data from the adjacent track (N+1 or N−1) without using NRZ data for track N. In embodiments employing error-sample based ITI cancellation, error samples for track N are correlated with NRZ data from the adjacent track (N+1 or N−1). The error samples are computed based on NRZ data for track N. Error samples are the difference between actual and ideal Y-sample values, where ideal Y-samples are computed using the NRZ data and channel information (such as partial response target or generalized partial response target). For example, ITI estimation and cancellation based on correlation of Y-samples 105 with detected data might be employed, such as described in related U.S. patent application Ser. Nos. 13/186,174, 13/186,197 and 13/186,213, all filed on Jul. 19, 2011, and incorporated by reference herein.

As shown in FIG. 4, steps 510, 512, 514 and 515 might collectively be referred to as "ITI preprocessing," as indicated by dashed line 516. After at least one of the NRZ data and Y-samples are read for the desired track (e.g., step 506) the read data might optionally begin processing at step 515 that might typically take a substantial time (e.g., on the order of a revolution of media 112). At step 515, ITI cancellation module 108 generates, based on the NRZ data for track N read at step 514, estimated ideal Y-sample values (e.g., ideal Y-sample values if there was no interference or other noise). The estimated ideal Y-sample values are compared with the actual Y-sample values read at step 510 to generate an estimated error signal representing a deviation between each Y-sample from the estimated ideal Y-sample value. Step 515 might typically be performed prior to collecting data from an adjacent track (e.g., at step 518). For example, step 515 might be performed while waiting for a next revolution of the disk to complete to perform the read operation of step 518.

At step 518, ITI cancellation module 108 reads, via read channel 100, data for a first side track (e.g., the dominant side track, indicated as track "N+1" in the example shown in FIG. 5) in a third revolution of media 112 (e.g., revolution 604 of FIG. 6). When recovering the NRZ data for the adjacent sectors at step 518, read channel 100 is set to raw-data mode.

Thus, after step 518, when the data is read from a first adjacent track (e.g., the dominant side track, indicated as track "N+1" in the example shown in FIG. 4), some ITI processing has already been completed without waiting for data from either side track to be read from media 112.

At step 520, ITI cancellation module 108 estimates ITI from track N+1 in track N. ITI in track N might be estimated similarly as described in regard to FIG. 4. For example, in embodiments employing error based ITI cancellation, the ITI is determined based on the NRZ data for track N+1 (e.g., read at step 418) and the estimated error signal (e.g., generated at step 415 based on the NRZ data for track N and characteristics of read channel 100) to determine how much error (e.g., ITI) was caused by adjacent track N+1. Each point of the error signal is correlated with the n closest NRZ bits of the adjacent track to determine how much each bit interfered with track N to produce an interference profile of estimated ITI. In embodiments employing Y-samples based ITI cancellation, Y-samples for track N are correlated with NRZ data from the adjacent track N+1 without using NRZ data for track N.

At step 522, ITI cancellation module 108 subtracts the estimated ITI for track N+1 from the NRZ data for track N. At step 524, ITI cancellation module 108 replays the sector(s) for track N using the ITI-cancelled data to iterative decoder 106 (e.g., as updated Y-samples 109) for decoding into detected data 111. At step 526, if iterative decoder 106 correctly recovers the sector(s) from track N, then, at step 536, the recovered data is provided as detected data 111 (e.g., to a host device not shown in FIG. 1A). At step 538, read operation 500 completes.

At step 526, if iterative decoder 106 does not correctly recover the sector(s) from track N, then, at step 528, ITI cancellation module 108 reads, via read channel 100, data for a second side track (e.g., the non-dominant side track, indicated as track "N−1" in the example shown in FIG. 5) in a fourth revolution of media 112 (e.g., revolution 606 of FIG. 6). When recovering the NRZ data for the adjacent sectors at step 528, read channel 100 is set to raw-data mode.

At step 530, ITI cancellation module 108 estimates ITI in track N from track N−1. ITI in track N might be estimated similarly as described in regard to FIG. 4. At step 532, ITI cancellation module 108 subtracts the estimated ITI for track N−1 from the Y-samples for track N. At step 534, ITI cancellation module 108 replays the sector(s) for track N using the ITI-cancelled data to iterative decoder 106 (e.g., as updated Y-samples 109) for decoding into detected data 111 At step 536, the recovered data is provided as detected data 111 (e.g., to a host device not shown in FIG. 1A). At step 538, read operation 500 completes. Thus, as shown in FIG. 5, ITI processing is further simplified such that cancellation for the second side track (e.g., the non-dominant side track) is only performed if the desired data from track N cannot be recovered after cancellation of the first side track (e.g., the dominant side track). While the extra replay attempt (e.g., at step 524 after ITI cancelling for the first side track) adds some additional processing time for process 500 versus process 400 if ITI from both side tracks needs to be cancelled, overall, process 500 might typically result in a greater reduction in latency than process 400 since it is likely that many sectors can be successfully recovered after cancelling out the ITI from the dominant side track.

Although shown in FIGS. 4 and 5 as reading track N, then track N+1 and then track N−1, the sequence of reading samples for track N and NRZ data for tracks N+1 and N−1 is not critical, and could be read in any order. ITI cancellation operation 400 might typically be employed when data is stored on media 112 in an aligned sector format, where sectors between adjacent tracks are aligned, within a phase error margin between adjacent sectors of up to several bits that occurs during the write process. ITI cancellation operation 400 might alternatively be employed when data is stored on media 112 using a non-aligned sector format.

Further, although described herein as each "bit" of a signal having a corresponding logic value, it is understood that the various signals described herein might employ multi-bit data symbols based on various data encoding schemes, such as pulse amplitude modulation (e.g., PAM-4). Further, although described herein as employing NRZ signaling, any signal encoding scheme might be employed.

FIG. 6 shows table 600 of the logical progress of the ITI cancellation routines of FIGS. 4 and 5 in relation to disk revolutions. As shown in the exemplary case of table 600, described embodiments start processing the data that is available early in the ITI cancellation process rather than waiting for all data to be collected before starting data processing, allowing ITI cancellation to complete and return corrected data faster. Column 1 of table 600 shows the revolutions of media 112 for an exemplary read operation. Column 2 shows when data from tracks N, N−1 and N+1 are read by read channel 100. Column 3 shows operation of an exemplary ITI cancellation routine. Column 4 shows the operation of process 400 shown in FIG. 4, and Column 5 shows the operation of process 500 shown in FIG. 5. As shown, described embodiments performing ITI cancellation (e.g., operating in accordance with one of process 400 and process 500) might reduce ITI cancellation latency by approximately 2 revolutions of media 112 versus embodiments operating in accordance with other ITI cancellation processes. As shown, processes 400 and 500 begin ITI cancellation prior to obtaining information from either of the side tracks (e.g., ITI cancellation processes 400 and 500 start before revolution 3 of media 112 to read the first side track). Thus, a significant amount of ITI processing is performed in parallel with read head 302 seeking to position over the side track and for the disk to complete the revolution to the desired sectors. Although not indicated in FIG. 6, in described embodiments, actual latency reduction might depend on the size of the sector(s) being read (e.g., 4 kB sectors might have greater latency reduction than 512B sectors).

Thus, as described herein, described embodiments provide a method of cancelling inter-track interference (ITI) from one or more sectors read from a desired track of a storage medium. A read channel reads sectors in a desired track of the storage medium. An iterative decoder of the read channel decodes the read sectors, and if the read sectors are incorrectly recovered from the storage medium, selected sectors of at least one adjacent track are read. An ITI canceller of the read channel estimates ITI in the read sectors of the desired track corresponding to the selected sectors of each adjacent track and subtracts the estimated ITI of the adjacent track from the data for the sectors of the desired track, providing updated sector data. The ITI cancelled data is replayed to the iterative decoder, which decodes the ITI cancelled data and provides the decoded ITI cancelled data as output data of the read channel.

While embodiments have been described with respect to processes of circuits, including possible implementation as a single integrated circuit, a multi-chip module, a single card, or a multi-card circuit pack, embodiments of the present invention are not so limited. As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. Embodiments of the present invention can also be manifest in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Transistors are typically shown as single devices for illustrative purposes. However, it is understood by those skilled in the art that transistors will have various sizes (e.g., gate width and length) and characteristics (e.g., threshold voltage, gain, etc.) and might consist of multiple transistors coupled in parallel to get desired electrical characteristics from the combination. Further, the illustrated transistors might be composite transistors.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of cancelling inter-track interference (ITI) from one or more sectors read from a desired track of a storage medium, the method comprising:

reading, by a read channel, one or more sectors in a desired track of the storage medium;

decoding, by a decoder of the read channel, the one or more read sectors;

if the one or more read sectors are incorrectly recovered from the storage medium:

providing, by a finite impulse response filter of the read channel, Y-samples corresponding to the read sectors to an ITI canceller;

providing, by the decoder, detected bits corresponding to the Y-samples to the ITI canceller, wherein an adjacent track is estimated by the steps of:

generating, by the ITI canceller, estimated ideal Y-sample values based on the data read for the desired track;

generating an estimated error signal based on a difference between the estimated ideal Y-sample values and actual Y-sample values corresponding to the data read for the desired track; wherein the steps of generating estimated ideal Y-sample values and generating the estimated error signal are performed prior to the step of reading selected sectors of at least one adjacent track; and estimating, based on the estimated error signal and sectors read from the adjacent track, ITI in the read sectors of the desired track corresponding to the selected sectors of the adjacent track;

reading selected sectors of a first adjacent track and a second adjacent track;

estimating, by an ITI canceller of the read channel, ITI in the read sectors of the desired track corresponding to the selected sectors of the first adjacent track and the second adjacent track;

subtracting, by the ITI canceller, the estimated ITI of the first adjacent track and the second adjacent track from the data for the one or more sectors of the desired track to provide updated sector data;

replaying the updated sector data to the decoder;

decoding, by the decoder, the updated sector data to provide ITI cancelled data; and providing the decoded ITI cancelled data as output data of the read channel;

otherwise, if the one or more read sectors are correctly recovered from the storage medium:

providing, by the decoder, the decoded one or more read sectors as output data of the read channel.

2. The method of claim 1, further comprising:

reading the one or more sectors of the desired track in a raw-data mode, wherein the data for the desired track is non-return-to-zero (NRZ) data.

3. The method of claim 2, wherein:

the step of reading the one or more desired sectors of the desired track occurs in a first revolution of the storage medium;

the step of reading the one or more sectors of the desired track in raw-data mode occurs in a second revolution of the storage medium;

the step of reading the corresponding sectors of the first adjacent track occurs in a third revolution of the storage medium; and the step of reading the corresponding sectors of the second adjacent track occurs in a fourth revolution of the storage medium.

4. The method of claim 1, further comprising reading the adjacent tracks in raw-data mode, wherein the data for the adjacent tracks is non-return-to-zero (NRZ) data.

5. The method of claim 1, wherein the one or more desired sectors of the desired track are read in a retry mode having a corresponding maximum global retry threshold and a corresponding maximum local retry threshold.

6. The method of claim 1, wherein, for the method the storage medium is a shingled magnetic recorded media.

7. A non-transitory machine-readable storage medium, having encoded thereon program code, wherein, when the program code is executed by a machine, the machine implements a method of cancelling inter-track interference (ITI) from one or more sectors read from a desired track of a storage medium, the method comprising:

reading, by a read channel, one or more sectors in a desired track of the storage medium;

decoding, by a decoder of the read channel, the one or more read sectors;

if the one or more read sectors are incorrectly recovered from the storage medium:

providing, by a finite impulse response filter of the read channel, Y-samples corresponding to the read sectors to an ITI canceller;

providing, by the decoder, detected bits corresponding to the Y-samples to the ITI canceller, wherein an adjacent track is estimated by the steps of:

generating, by the ITI canceller, estimated ideal Y-sample values based on the data read for the desired track;

generating an estimated error signal based on a difference between the estimated ideal Y-sample values and actual Y-sample values corresponding to the data read for the desired track; wherein the steps of generating estimated ideal Y-sample values and generating the estimated error signal are performed prior to the step of reading selected sectors of at least one adjacent track; and estimating, based on the estimated error signal and sectors read from the adjacent track, ITI in the read sectors of the desired track corresponding to the selected sectors of the adjacent track;

reading selected sectors of a first adjacent track and a second adjacent track;

estimating, by an ITI canceller of the read channel, ITI in the read sectors of the desired track corresponding to the selected sectors of the first adjacent track and the second adjacent track;

subtracting, by the ITI canceller, the estimated ITI of the first adjacent track and the second adjacent track from the data for the one or more sectors of the desired track to provide updated sector data;

replaying the updated sector data to the decoder;

decoding, by the decoder, the updated sector data to provide ITI cancelled data; and providing the decoded ITI cancelled data as output data of the read channel;

otherwise, if the one or more read sectors are correctly recovered from the storage medium:

providing, by the decoder, the decoded one or more read sectors as output data of the read channel.

8. A non-transitory machine-readable storage medium of claim 7, further comprising:

reading the one or more sectors of the desired track in a raw-data mode, wherein the data for the desired track is non-return-to-zero (NRZ) data.

9. A non-transitory machine-readable storage medium of claim 8, wherein:

the step of reading the one or more desired sectors of the desired track occurs in a first revolution of the storage medium;

the step of reading the one or more sectors of the desired track in raw-data mode occurs in a second revolution of the storage medium;

the step of reading the corresponding sectors of the first adjacent track occurs in a third revolution of the storage medium; and the step of reading the corresponding sectors of the second adjacent track occurs in a fourth revolution of the storage medium.

10. A non-transitory machine-readable storage medium of claim 7, further comprising reading the adjacent tracks in raw-data mode, wherein the data for the adjacent tracks is non-return-to-zero (NRZ) data.

11. A non-transitory machine-readable storage medium of claim 7, wherein the one or more desired sectors of the desired track are read in a retry mode having a corresponding maximum global retry threshold and a corresponding maximum local retry threshold.

12. A non-transitory machine-readable storage medium of claim 7, wherein, for the method the storage medium is a shingled magnetic recorded media.

* * * * *